MAGNETIC RECORDING

Filed April 1, 1952

INVENTOR
Dallas R. Andrews
BY Morris L. Rebkin
ATTORNEY

United States Patent Office 2,751,274

Patented June 19, 1956

2,751,274

MAGNETIC RECORDING

Dallas R. Andrews, Collingswood, N. J., assignor to Radio Corporation of America, a corporation of Delaware Application April 1, 1952, Serial No. 279,868

12 Claims. (Cl. 346—74)

This invention relates to magnetic recording and reproducing apparatus, and more particularly to means for mounting a transducer for cooperative engagement with any one of a selected number of record tracks on a magnetic record medium or member.

In automatic computing or accounting apparatus, it has been found desirable to utilize magnetic recording media for the storage of data to be used in the apparatus. The recording medium may be in the form of a drum, a disk, or a tape, each of which may bear several adjacent record tracks. The present invention relates particularly to apparatus wherein the record receiving or bearing medium is in the form of either a drum or disk.

When the record receiving or bearing medium is in the form of a drum, the record may be subdivided to occupy several parallel tracks around the periphery of the drum. On the other hand, when the record receiving or bearing medium is in the form of a disk, the record may occupy several concentric circular tracks on either or both of the flat surfaces of the disk. For some purposes, it has been found desirable to employ a single movable transducer for each record member rather than a separate transducer for each track. With regard to the drum type record carrier or member, it is conventional to utilize a cylindrical drum. The associated transducer is provided with means for moving the transducer with substantially pure translational motion across the face of the drum to engage a selected one of the parallel tracks. Similarly, a transducer employed with the disk type record is provided with means for moving it with substantially pure translational motion across the face of the disk to engage a selected one of the concentric circular tracks.

Because the track selector mechanism necessary to produce the substantially pure translational motion of the transducer is relatively complicated and has substantial mass, the movement of the transducer to the selected track would be relatively slow.

Accordingly, it is an object of the present invention to provide an improved track selector mechanism for moving a transducer into operative engagement with a selected track on a disk or drum type magnetic record member.

Another object of this invention is to provide a selector mechanism as set forth wherein a carrier for the transducer moves with a rotational motion.

A further object of this invention is to provide an improved magnetic record handling apparatus for magnetic memory units which comprise a plurality of record members and their corresponding transducers, characterized in that the transducers associated with the record members are moved to selected record tracks through rotational movement of a carrier arm associated with each of the transducers.

In accomplishing these and other objects there has been provided, in accordance with this invention, a track selector mechanism for drum or disk type magnetic records having a plurality of parallel record tracks in which a transducer is mounted on a carrier arm positioned adjacent to the disk or drum. The arm is driven with a rotary motion by a suitable motor unit. The rest position of the arm, which, in turn, determines the position of the transducer and, therefore, the track to be engaged by the transducer, is determined by a set of solenoid operated stop pins one of which engages the arm while it is being rotated, stopping the arm at a selected position. The solenoids associated with the pins are energized by a selector control circuit.

A better understanding of the present invention may be had from the following detailed description when read in connection with the accompanying drawings, in which.

Figure 1:
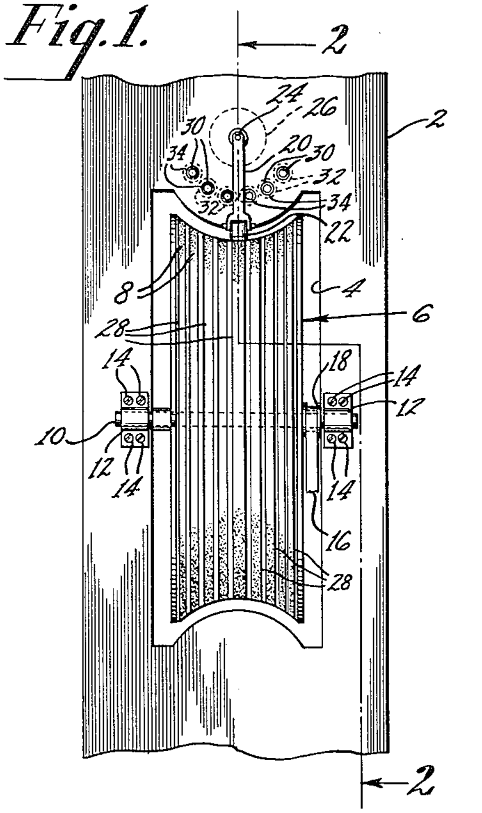
Fig. 1 is an elevational view of an illustrative apparatus embodying the present invention as applied to a drum type record member.
Figure 2:
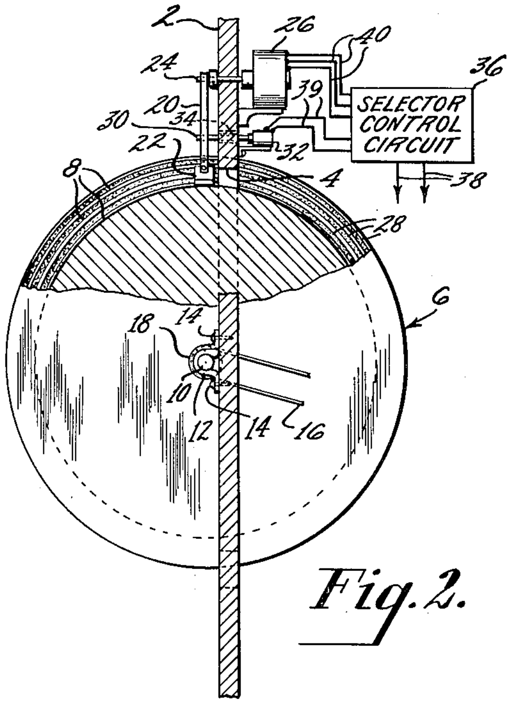
Fig. 2 is a view, partly in section, taken along the line 2—2 of Fig. 1 as viewed in the direction indicated by the arrows.

Referring now to the drawings, there is shown, in Figs. 1 and 2, a mounting panel 2 having an opening 4 therethrough. In the opening 4 there is positioned a drum 6 having a coating or layer 8 of magnetizable material such as magnetic iron oxide. The coating is shown as having recorded strips or tracks each bearing the designation 28. The drum 6 is mounted on an axle 10 which is journaled in suitable bearings 12. The latter are secured to the mounting panel 2 adjacent to the opening 4 therein, as by screws 14. Suitable means are provided for driving the drum 6, such as a belt 16 which engages a pulley 18 mounted adjacent to the drum 6 on the axle 10. The belt 16 may be driven by any suitable motor (not shown).

It is to be noted that the surface of the drum 6 bearing the coating 8 of magnetizable material, instead of being cylindrical, is defined as a concave circular surface of revolution.

Mounted on the panel 2 above (as viewed in the drawing) the drum 6 is a transducer carrier arm 20. A transducer 22 of any known or suitable type is carried on one end of the arm 20 in a position to engage the surface of the drum 6. The end of the arm opposite from the transducer is secured to the shaft 24 of a suitable motor 26. The motor 26 should be of a type which may be driven in either direction. The shaft 24 is located on the mounting panel 2 in a position to be at the center of curvature of the surface of the drum 6. Thus, as the motor 26 drives the arm 20 about that center, the transducer 22 will be successively in operative engagement with the record surface, composed of the tracks 28 of magnetizable material, of the drum 6.

As was hereinbefore indicated the record surface of the drum 6 is divided into a plurality of parallel record tracks 28. In order to bring the transducer 22 into registration with any selected one of those tracks 28, there is provided a number of stop pins 30 which are retractable from an advanced position. The operation of these pins 30 is controlled by corresponding and associated solenoids 32. The solenoids 32 are mounted on the rear side of the mounting panel 2 with the pins 30 protruding through suitable openings 34 in the panel. Energization of each of the solenoids 32 is controlled by a selector control circuit 36. Information from a suitable source (not shown) is supplied to the selector control circuit 36 over leads 38. The information thus supplied indicates which of the several tracks 28 the transducer 22 is to engage. The selector control circuit 36 translates this information, and energizes the appropriate one of the solenoids over suitable leads 39. All of the pins 30 are retracted except one which is adjacent to the position the arm 20 would occupy if the transducer 22 were in position to engage the selected track. The motor 24 is then energized, under the control of the selector control circuit 36 over the leads 40, to move the arm 20 in the proper direction to move the transducer 22 into position to engage the selected track. The movement of the arm 20 is arrested at the proper position by the stop pin 30 which is not retracted. Thus, the cooperative action of the motor 26, the arm 20, and the stop pins 30, all under the control of the selector control circuit, results in the indexing of the transducer 22 in a position to engage the selected one of the record tracks 28.

Figure 3:
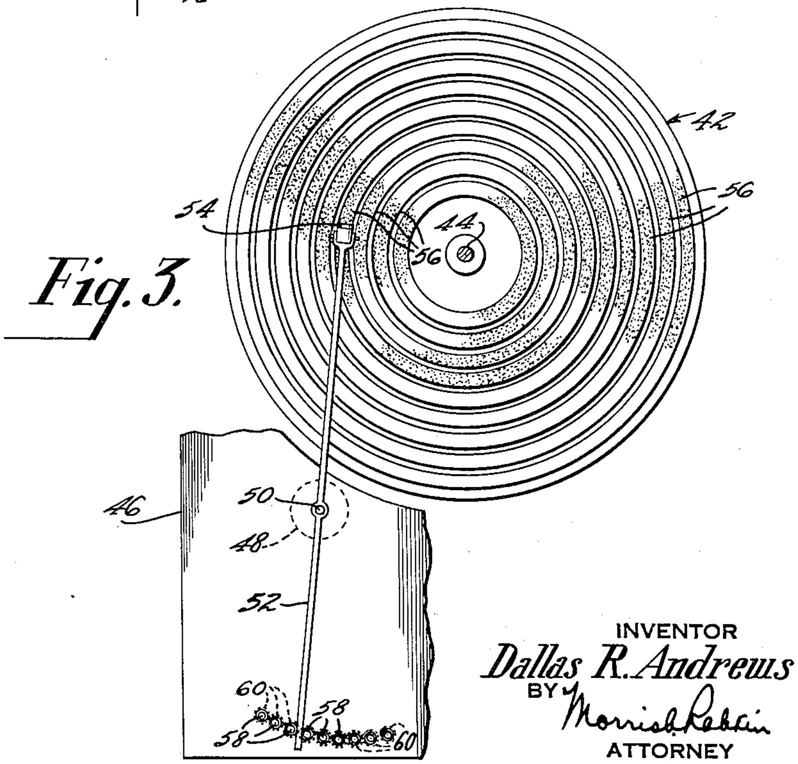
Fig. 3 is an elevational view of an illustrative apparatus embodying the present invention as applied to a disk type record member.

In Fig. 3, there is shown another embodiment of the invention. In this form, the magnetic record medium comprises a disk 42 which may be made of metal or plastic. One or both flat faces of the disk 42 may have a layer of magnetizable material deposited thereon similar to the layer 8 described with respect to the drum 6. The disk may be mounted on and adapted to be rotated about a shaft 44. Adjacent to the disk 42 and substantially coplanar therewith is a mounting panel 46, illustrated in fragmentary form. A motor 48 is mounted on the rear side of the panel 46 and appears in dotted outline on the drawing. This motor 48 has a shaft 50 which protrudes through the panel 46. A transducer carrier arm 52 is secured to and adapted to be driven by the motor shaft 50. A transducer 54 is mounted on one end of the arm 52 and positioned to operatively engage the record surface of the disk 42. As in the case of the drum, the record surface of the disk is divided into a plurality of parallel record tracks 56. Here, however, the parallel tracks 56 comprise a number of concentric circular tracks. In order to index the transducer 54 into operative engagement with a selected one of the circular tracks 56, there is provided a set of stop-pins 58 which are operated by a corresponding number of solenoids 60. As before, these solenoids are energized in response to information supplied to a selector control circuit (not shown in Fig. 3). The selector control circuit in conjunction with the stop-pins 38 and the carrier arm 52 function in a manner similar to that described in the discussion of the apparatus as applied to the drum as shown in Figs. 1 and 2.

Thus it may be seen that there has been provided an improved magnetic record handling apparatus for magnetic memory units wherein a rapid selection of record tracks may be had through the rotational movement of a transducer carrier arm and solenoid operated stop means for indexing the transducer in operative engagement with a selected record track.

What is claimed is:

1. A magnetic record handling apparatus for magnetic memory units of the type having a movable magnetic record member with a plurality of parallel record tracks thereon extending in the general direction of movement of the magnetic record member, said apparatus comprising, in combination, a transducer for operatively engaging said magnetic record member, a carrier arm for said transducer, said carrier arm being rotationally movable in a direction substantially transverse to the direction of movement of the record member to position said transducer in operative engagement with a selected one of said record tracks, and indexing means for stopping said arm in said position.

2. A magnetic record handling apparatus for magnetic memory units of the type having a movable magnetic record member with a plurality of parallel record tracks thereon extending in the general direction of movement of the magnetic record member, said apparatus comprising, in combination, a transducer for operatively engaging said record member, a carrier arm for said transducer, said carrier arm being rotationally movable in a direction substantially transverse to the direction of movement of the record member to position said transducer in operative engagement with a selected one of said record tracks, and selectively operable indexing means for stopping said arm in said position.

3. The invention as set forth in claim 2 wherein said indexing means includes a plurality of stop pins, said pins being selectively retractable from an advanced position and positioned when advanced to interfere with the movement of said arm.

4. The invention as set forth in claim 3 wherein a selectively energizable solenoid is operatively connected to each of said stop pins to control the retraction thereof.

5. A magnetic record handling apparatus for magnetic memory units of the type having a movable magnetic record member with a plurality of parallel record tracks thereon extending in the general direction of movement of the magnetic record member, said apparatus comprising, in combination, a transducer for operatively engaging said record member, a carrier arm for said transducer, means for rotationally moving said arm in a direction substantially transverse to the direction of movement of the record member to position said transducer in operative engagement with a selected one of said record tracks, and selectively operable indexing means for stopping said arm in said position.

6. The invention as set forth in claim 5 wherein said means for rotationally moving said arm comprises a motor which may be driven in either of two directions.

7. A magnetic memory unit comprising, in combination, a magnetic record member having a plurality of parallel record tracks thereon, a transducer for operatively engaging said record member, means for advancing said record member relative to said transducer, said parallel tracks extending generally in the direction of the advancement of said record member, a carrier arm for said transducer, means for rotationally moving said arm in a direction transverse to the direction of advancement of said record member to position said transducer in operative engagement with a selected one of said record tracks, and selectively operable indexing means for stopping said arm in said position.

8. The invention as set forth in claim 7 wherein said record member comprises a drum having a layer of magnetizable material around the periphery thereof constituting a record surface.

9. The invention as set forth in claim 8 wherein said drum has an axis and said record surface is a concave circular surface of revolution generated about said axis.

10. The invention as set forth in claim 7 wherein said record member comprises a disk having a layer of magnetizable material deposited on at least one of the faces thereof constituting a record surface.

11. A magnetic memory unit comprising, in combination, a magnetic record drum having a plurality of parallel peripheral record tracks thereon, said record tracks comprising a record surface, means for rotating said drum about its transverse axis, said record surface being a concave circularly curved surface of revolution generated about said axis, a transducer for operatively engaging said record tracks, a carrier arm for said transducer, means for rotationally moving said arms in a direction transverse of said concave surface to position said transducer in operative engagement with a selected one of said peripheral record tracks, and selectively operable indexing means for stopping said arm in said position.

12. A magnetic memory unit comprising, in combination, a magnetic record disk having a plurality of concentric, circular record tracks, a transducer for operatively engaging said record tracks, a carrier arm for said transducer, means for rotationally moving said arm to position said transducer in operative engagement with a selected one of said tracks, and selectively operable indexing means for stopping said arm in said position, said indexing means comprising a plurality of solenoid operated stop pins, said pins being retractable from an advanced position and positioned, when advanced, to interfere with the movement of said arm.

References Cited in the file of this patent

UNITED STATES PATENTS

| | | |
|---|---|---|
| 1,697,166 | Davis | Jan. 1, 1929 |
| 2,245,286 | Marzocchi | June 10, 1941 |
| 2,259,631 | Flood | Oct. 21, 1941 |
| 2,546,821 | Hansen | Mar. 27, 1951 |